C. L. HEISLER.
LOCOMOTIVE ENGINE.
APPLICATION FILED MAY 12, 1914.
1,111,456.
Patented Sept. 22, 1914.
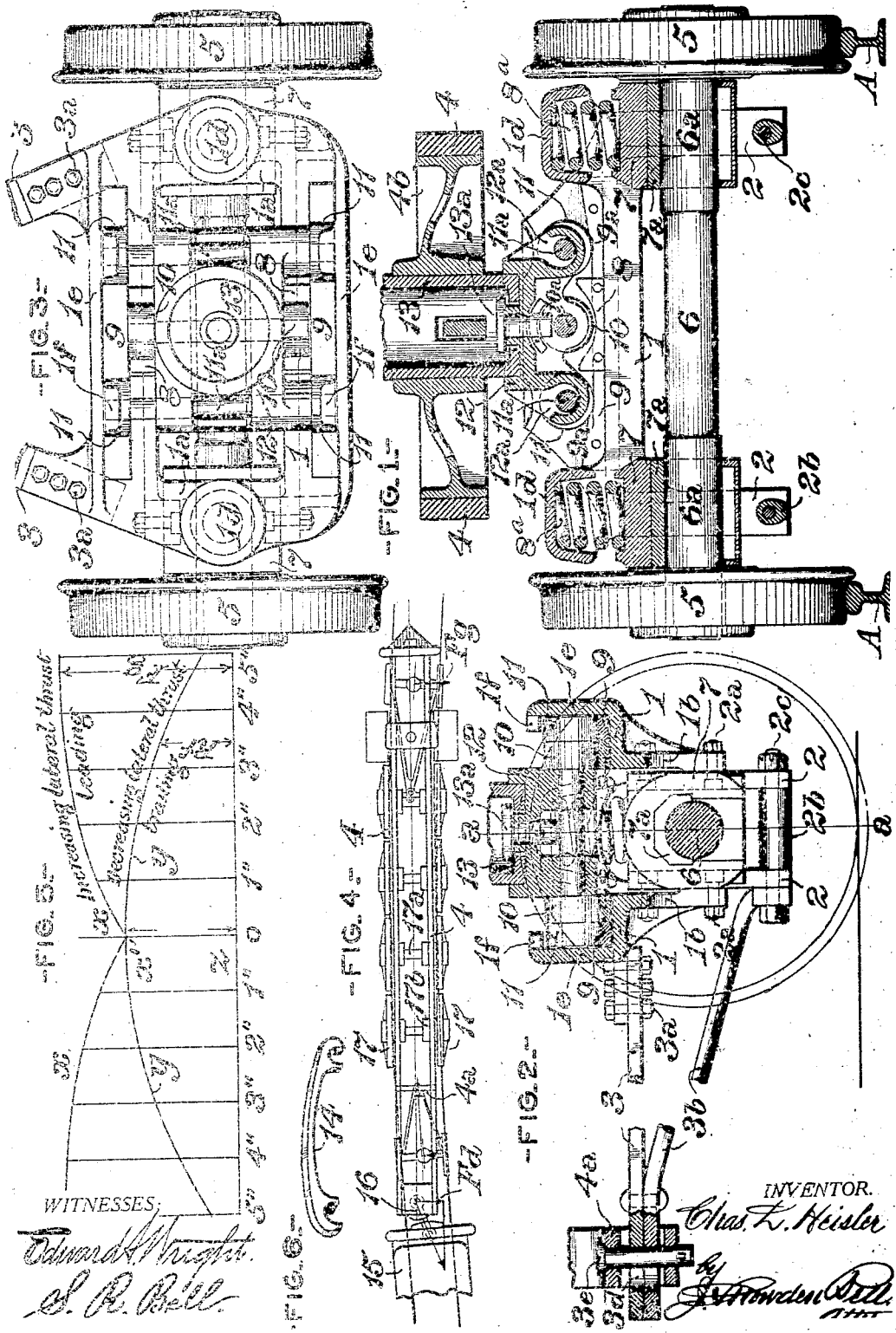
INVENTOR.
Chas. L. Heisler
WITNESSES:

UNITED STATES PATENT OFFICE.

CHARLES L. HEISLER, OF SCHENECTADY, NEW YORK.

LOCOMOTIVE-ENGINE.

1,111,456.  Specification of Letters Patent.  Patented Sept. 22, 1914.

Application filed May 12, 1914. Serial No. 837,987.

*To all whom it may concern:*

Be it known that I, CHARLES L. HEISLER, of Schenectady, in the county of Schenectady and State of New York, have invented a certain new and useful Improvement in Locomotive-Engines, of which improvement the following is a specification.

My invention relates to automatically operative means for converting the guiding action of the leading truck of a locomotive engine into that of a trailing truck, and vice versa, when the locomotive changes its direction of motion, by changing the character or nature of the resistance of the truck to lateral movement or swing, more particularly when passing around a curve.

The objects of my invention are to insure greater safety from derailment when the locomotive changes its direction of movement; to materially increase the effective action of a truck in guiding a locomotive around a curve; and to render its action equally effective in rearward and in forward movement.

A further object of the invention is to simplify and economize the manufacture and maintenance of the truck, and to render it readily adaptable to different conditions of road service, by changes of removable minor parts which can be economically manufactured in large numbers by templets and applied after the trucks are assembled, or readily changed after the locomotive has been put in service.

The improvement claimed is hereinafter fully set forth.

In the accompanying drawing: Figure 1 is a vertical transverse section through a two wheel locomotive, truck, on the line *a a* of Fig. 2, illustrating an application of my invention; Fig. 2, a vertical longitudinal central section; Fig. 3, a plan or top view; Fig. 4, a diagrammatic plan view of a locomotive frame and part of a connected tender, indicating the relative resistances to lateral movement of a truck when used as a leading or a trailing truck, respectively; Fig. 5, a diagram illustrating the nature of the guiding effect of a truck and its resistance to lateral movements relatively to the locomotive frame, when acting as a leading or as a trailing truck; and, Fig. 6, a view, in perspective, of a filler member.

My invention is herein exemplified as applied in connection with a locomotive engine truck of the two wheel radial type, which is one of the approved constructions of present standard practice, and which does not, in and of itself, and apart from the accessories hereinafter described, form part of my present invention.

The truck frame proper is substantially rectangular in plan, and comprises two parallel transoms, 1, 1; two integral side members, $1^a$, connecting the ends of the transoms; and a pair of vertical pedestal brackets, $1^b$, formed on each of the transoms. A rectangular pedestal bar, 2, is secured to the inner side of each of the pedestal brackets, by bolts, $2^a$, the pedestal bars on each side of the frame constituting a pair of jaws, the lower ends of which project below the pedestal brackets and are connected by interposed horizontal tie bars, $2^b$, and tie bolts, $2^c$. Longitudinally and inwardly extending upper radius bars, 3, are connected to lugs, $1^c$, formed on the ends of one of the transoms, $1^b$, by bolts, $3^a$, and similarly extending lower radius bars, $3^b$, are each connected to one of the pedestal bars on each side of the frame, by the tie bolt, $2^c$, of said pedestal bar. The outer ends of the upper and lower radius bars are riveted or bolted together, and the truck frame is coupled, through said radius bars, to a cross tie, $4^a$, secured at its ends to the side members, 4, of the locomotive frame, by a pivot, $3^e$, passing through longitudinal slots, $3^d$, in the radius bars.

The truck frame is supported upon a pair of wheels, 5, secured upon an axle, 6, the journals, $6^a$, of which rotate in bearings, $7^a$, fixed in journal boxes, 7, which are fitted with the capacity of relative vertical movement, in the pairs of pedestal bars, 2, above described. Helical springs, $8^a$, are interposed between the tops of the journal boxes and spring seats, $1^d$, formed on the side members, $1^a$, of the truck frame.

The tops of the transoms, 1, are machined to truly horizontal surfaces, to form seats for bolster roller tracks or guide bars, 8 and 9, which are disposed transversely on the truck frame, adjacent to each other on each transom, and provide guiding and resisting surfaces, and guide ways, for bolster supporting "leading" rollers, 10, and "trailing" rollers, 11.

The guides, 9, of the trailing rollers, 11, are formed with upwardly curved portions, $9^a$, in which the rollers normally rest, and are thence upwardly inclined, and the guides, 8, of the leading rollers, are formed with concave surfaces, the upward curvature of which increases much more rapidly than the inclination of the guides, 9. The rollers, 10 and 11, are fixed on axles, 10ª, and 11ª, respectively, which rotate in bearings formed on a transversely extending bolster, 12, which is supported on said rollers, between the transoms, 1, 1, with the capacity of lateral movement relatively to the longitudinal central plane of the locomotive. While the circular contour of the rollers herein shown is preferable, it is not essential, inasmuch as the rollers are not required to make a complete revolution, and rocking members of other than cylindrical form may be substituted without departure from the spirit and operative principle of my invention. The rollers and their axles are housed and prevented from movement longitudinally on the truck frame by vertical ribs, 1ᵉ, formed integral with the transoms, 1, said ribs performing the additional function of strengthening members of the truck frame. Lugs, 1ᶠ, formed on the tops of the ribs, 1ᵉ, project over the rollers, 11, and serve to prevent undue or excessive vertical movement of the bolster, relatively to the truck frame.

To insure perfect lubrication, pockets, 12ª, are formed in the bolster, said pockets inclosing the middle portion of the two outer roller axles, 11ª, on which the bolster is allowed a predetermined degree of free longitudinal movement, this being for a distance equal to the width of one of the roller tracks, 9, as indicated in Fig. 3. The freedom of such movement, by reason of well known laws governing impending and sliding friction, is enhanced by any longitudinal movement of the bolster, however small, which may cause complete or partial rotation of the axles. A vertical center casting, 13, is fitted in the top of the bolster, and is coupled thereto by a center pin, 13ª. The center casting, 13, is fitted in a cross tie, 4ᵇ, secured, at its ends, to the locomotive frame side members, 4.

As shown in Fig. 2, the central planes of the bolster, 12, center casting, 13, and center pin, 13ª, stand in the axial plane of the truck axle, 6, these positions being those occupied during the forward movement of the locomotive, when going toward the right of the figure, and with the truck operating as a leading truck, and the pivot, 3ᶜ, stands at the right hand end of the slots, 3ᵈ, of the radius bars. In the application of the improvement in connection with a four wheel truck, the radius bars and their pivot are obviously not required, as a truck of such type is self-guiding.

When operating as a leading truck as above specified, the two leading rollers, 10, stand directly over and on the guides, 8, the more rapid upward curvature of which imparts a greater increase in rate of retardation to the movement of the rollers transversely to the truck than is imparted to the trailing rollers, 11, by the less steeply inclined guides, 9. The guides, 8, may cause either of the pairs of trailing rollers, 11, to be slightly raised from their guides, 9, without objectionable result, when the bolster moves a considerable distance laterally from its normal middle position. While the locomotive is going in a forward direction, the resistance of the track rails, A, A, to the movement of the wheels, will hold the truck and bolster in the leading position shown in Figs. 2 and 3, and such resistance being greatest on the sharpest curves, the truck will be held more firmly to its proper position when most needed. Upon the reversal of the direction of motion of the locomotive, the resistance of the track rails will cause the truck to move automatically in the opposite direction, relatively to the frame, 4, of the locomotive; the pivot, 3ᶜ, will engage the opposite end of the slots, 3ᵈ; and the bolster will slide on the two axles, 11ª, through a distance equal to the width of one of the guides, 9. The leading rollers, 10, will be automatically moved from their guides, 8, 9, and the lateral movements of the bolster, 12, will be retarded only by the lesser resistances of the guides, 9. No injury will result if the leading rollers, 10, should chance to slide from their guides when the truck is not in neutral position with respect to the frame of the locomotive, as the drop of the rollers from one pair of bars to the other is very slight, and is instantly compensated for by the cushioning effect of the springs, 8ª.

Should it, for any reason, be desired to prevent the automatic change, above described, of the operation of the truck, it is merely necessary to place a filler, 14, of the form shown in Fig. 6, having a width equal to the degree of longitudinal movement of the bolster, on the axles, 11ª, of the trailing rollers, upon which the truck may be operated continuously, either as a leading or as a trailing truck, depending upon the position in which the bolster is blocked by the filler. Further, if desired, the rollers, 10, and their guides, 8, may be omitted, to effect the same purpose, without otherwise changing the construction of the truck.

The diagrammatic plan view, Fig. 4, illustrates the application of two automatically convertible trucks, of the construction hereinbefore described, to a locomotive which is coupled to a tender, 15, by a draw bar, 16; the driving wheels, 17, of the locomotive, being secured upon driving axles, 17ª, rotating in driving boxes, 17ᵇ, which are fitted, in the ordinary manner, in pedestals in the side frame members, 4, of the locomotive. The locomotive is assumed to be moving forward on a curve toward the right of the figure, at considerable speed, in which case the leading truck will manifestly exert a material amount of lateral thrust at the front end of the locomotive, as indicated by the dart, $F^s$, for the purpose of guiding the locomotive toward its right side and toward the inner side of the curve. The train resistance, acting through the tender 15, and the connected train, induces a lateral resisting force, indicated by the dart, $F^d$, which, by fulcruming on the driving wheels, resists the lateral thrust effort, $F^s$, of the leading truck, in its guiding action on the locomotive toward the right around the curve. The assumed value of $F^s$ is plotted in Fig. 5, for different curvatures and lateral positions, or swing of the truck from its mid or normal position in the central plane of the locomotive frame. The two upper curves, $x$, $x$, of Fig. 5, showing the value of $F^s$ for an increasing lateral thrust, begin in the intersection, $x'$, in the middle ordinate marked $o$ on the base line $z$, for the corresponding middle position of the truck.

The distance of the intersection from the base line is a measure of the initial resistance to lateral movement on a trailing truck, or the initial lateral guiding thrust that is exerted on the front end of a locomotive frame by a leading truck, at the instant it leaves the middle position, as when entering a curve from a straight track. This initial resistance and thrust is, for simplicity, preferably made the same amount when the truck operates either as a leading or as a trailing truck, but can, if desired, be made different by forming the roller guide bars to suit the desired resistance or thrust. The values and curves corresponding to $F^s$, may also be changed, as well as those for $R^t$, the lateral resistance when operating as a trailing truck, which is preferably made to decrease as the truck swings laterally away from the locomotive frame, as shown by the curve, $y$. The numerals, 1″, 2″, 3″, 4″ and 5″, below the base line $z$, indicate the number of inches the center of the truck swings laterally to the right or left of the longitudinal central plane of the locomotive. The initial resistance measured vertically from $o$, on the base line to the intersection $x'$, is preferably a minimum amount consistent with steady riding and absence of "nosing," when running at full normal speed on comparatively straight track. This resistance is provided by the upward curves, $9^a$, of the trailing roller guides, which engage the trailing rollers and resist their movement from normal middle position, and the inclined portions of the guides are predetermined to give a decreasing retardation corresponding to the curves, $y$, or a constant retardation, if desired.

When the direction of movement of the locomotive is reversed, the thrust effort, $F^s$, must exchange places with the lateral resistance, $R^t$, to counteract the changed direction of the resistance, $F^d$, at the draw bar, and to properly guide the locomotive around a curve, the changes being automatically accomplished by the movement of the bolster, 12, and its related parts, longitudinally on the truck frame, as hereinbefore described. The same applies when the locomotive is backing, and is coupled to a train at its normally front or pilot end.

The feature of automatic adjustability of a truck to the conditions of trailing or of leading service as the case may be, which is characteristic of my invention, adapt it to a wide field of application and range of utility, and the simple form of the truck and its accessories enable it to be inexpensively manufactured in quantity and readily repaired when required.

I claim as my invention, and desire to secure by Letters Patent:

1. In a locomotive engine, the combination of a main frame, driving wheels carrying a portion of the weight thereon, a lateral motion truck supporting one end thereof, and automatically operable means interposed between the main frame and truck frame, for changing the resistance to lateral motion of said truck in forward and in backward motion, respectively, and thereby enabling it to effectively operate as a leading truck in one direction of movement of the locomotive and as a trailing truck in the opposite direction of movement.

2. In a locomotive engine, the combination of a main frame, driving wheels carrying a portion of the weight thereon, a lateral motion truck supporting one end thereof, and automatically operable means interposed between the main frame and truck frame for imparting a determined resistance to lateral motion of the truck when acting as a leading truck in the forward movement of the locomotive and a lesser resistance when acting as a trailing truck in the rearward movement of the locomotive.

3. In a locomotive engine, the combination of a main frame, driving wheels carrying a portion of the weight thereon, two lateral motion trucks, each supporting one end thereof, and automatically operable means interposed between the main frame and each of the truck frames, for changing the resistance to lateral motion of said trucks in forward and in backward motion, respectively, and thereby enabling each of said trucks to effectively operate as a leading truck in one direction of movement of the locomotive and as a trailing truck in the opposite direction of movement.

4. In a locomotive engine, the combination of a main frame, driving wheels carrying a portion of the weight thereon, a lateral motion truck supporting one end thereof, a truck guiding member fixed to the main frame, and adapted to engage the truck with a predetermined degree of longitudinal slip or movement of the truck, relatively to the main frame, and automatically operable means, interposed between the truck guiding member and the truck frame, for changing the resistance to lateral motion of the truck in forward and in backward motion, respectively, and thereby enabling it to effectively operate as a leading truck in one direction of movement of the locomotive and as a trailing truck in the opposite direction of movement.

5. In a locomotive engine, the combination of a main frame, driving wheels carrying a portion of the weight thereon, a lateral motion truck supporting one end thereof, a guiding member fixed to the main frame and adapted to engage the truck with the capacity of relative longitudinal movement, and automatically operable means mounted on the truck and actuated by rail resistance to the truck wheels to impart a predetermined degree of longitudinal movement to the truck, relatively to the main frame, and change the resistance of the truck to lateral movement, relatively to said frame.

6. In a locomotive engine, the combination of a main frame, driving wheels carrying a portion of the weight thereon, a lateral motion truck supporting one end thereof, transversely extending roller guide bars supported on the truck frame and having bearing surfaces which are upwardly curved to exert a predetermined initial resistance to movement of a bolster laterally on the frame and upwardly and outwardly inclined to exert a different resistance to further bolster movement, a lateral motion bolster disposed above the guide bars, and rollers journaled in the bolster and traversing on the guide bars.

7. In a locomotive engine, the combination of a main frame, driving wheels carrying a portion of the weight thereon, a lateral motion truck supporting one end thereof, a plurality of pairs of transversely extending roller guide bars supported on the truck frame and having bearing surfaces which are upwardly and outwardly inclined on different degrees of inclination in the pairs, respectively, a lateral motion bolster disposed above the guide bars with the capacity of longitudinal movement on the truck frame relatively thereto, and rollers journaled in the bolster and adapted to traverse on one or another pair of guide bars in accordance with longitudinal movements of the bolster, relatively to the truck frame.

8. In a locomotive engine, the combination of a main frame, driving wheels carrying a portion of the weight thereon, a lateral motion truck supporting one end thereof, a plurality of pairs of transversely extending roller guide bars supported on the truck frame and having bearing surfaces which are upwardly and outwardly inclined on different degrees of inclination in the pairs, respectively, a lateral motion bolster disposed above the guide bars with the capacity of longitudinal movement on the truck frame relatively thereto, a roller axle journaled in the bolster, rollers fixed on said axle, and adapted to traverse on either of the pairs of guide bars, in accordance with longitudinal movements of the bolster relatively to the truck frame, roller axles of greater length journaled in the bolster with freedom of movement of the bolster longitudinally on the frame relatively thereto, and rollers fixed on said axles and adapted to traverse on one pair only of the guide bars.

9. In a locomotive engine, the combination of a main frame, driving wheels carrying a portion of the weight thereon, two lateral motion trucks, each supporting one end thereof, guiding members fixed to the main frame, each adapted to engage one of the trucks with the capacity of relative longitudinal movement, a plurality of pairs of transversely extending roller guides supported on the frame of each of the trucks, and having bearing surfaces which are upwardly and outwardly inclined on different degrees of inclination in the pairs, respectively, lateral motion bolsters, each disposed in one of the trucks above the guide bars with the capacity of longitudinal movement on the truck frame relatively thereto, a roller axle journaled in each bolster, rollers fixed on said axle and adapted to traverse on either of the pairs of guide bars, in accordance with longitudinal movements of the bolster, relatively to the truck frame, roller axles of greater length journaled in each bolster with freedom of movement of the bolster longitudinally on the frame relatively thereto, and rollers fixed on said axles and adapted to traverse on one pair only of the guide bars; these members being combined for joint operation to automatically effect the transfer of operative capacity of each truck from that of a leading to that of a trailing truck upon a change in the direction of movement of the locomotive.

10. In a locomotive engine, the combination of a main frame, driving wheels carrying a portion of the weight thereon, a lateral motion truck supporting one end thereof, a longitudinally slotted radius bar extending from the frame of the truck in the direction of the adjacent driving wheel axle, a pivot coupling the radius bar to the main frame through the slot of the radius bar and providing for longitudinal movement of the truck relatively to the main frame, and automatically operable means, interposed between the main frame and truck frame and actuated by longitudinal movements of the truck frame relatively to the main frame, for imparting a determined resistance to lateral motion of the truck when acting as a leading truck in the forward movement of the locomotive, and a lesser resistance when acting as a trailing truck in the rearward movement of the locomotive.

11. In a locomotive engine, a lateral motion truck adapted to support one end of the main frame of the locomotive, and comprising a substantially rectangular frame, pedestal brackets projecting downwardly thereon, pairs of vertical pedestal bars of rectangular section secured removably to the pedestal brackets, journal boxes fitted between the pedestal bars with the capacity of relative vertical movement, spring seats located above and formed integral with the pedestal brackets, springs interposed between said seats and the journal boxes, a radius bar connected to the truck frame, means for connecting the lower ends of each pair of pedestal brackets to each other and to the radius bar, and a bolster supported on the truck frame.

12. In a locomotive engine, the combination of a main frame, driving wheels carrying a portion of the weight thereon, a lateral motion leading truck supporting the front end of the main frame, means, interposed between said truck and the main frame, for exerting a predetermined minimum lateral guiding effort to the main frame when the truck is traversing a comparatively straight track and is in its middle or neutral position, and for exerting an increasing guiding effort when the truck swings from its neutral toward its outward positions, a lateral motion trailing truck supporting the rear end of the main frame, and means, interposed between said truck and the main frame, for exerting a maximum lateral guiding effort to the main frame when the truck is in its middle or neutral position, and for exerting a decreasing resistance as the truck swings toward its extreme outward positions, in order to reduce the resistance to the action of the leading truck in guiding the locomotive around curves.

CHARLES L. HEISLER.

Witnesses:
J. SNOWDEN BELL,
EDWARD A. WRIGHT.